United States Patent
Kim et al.

(10) Patent No.: US 12,181,028 B2
(45) Date of Patent: Dec. 31, 2024

(54) WASHING MACHINE DRIVING SYSTEM AND A WASHING MACHINE WITH THE SAME

(71) Applicant: LG Electronics Inc., Seoul (KR)

(72) Inventors: Kyeonghwan Kim, Seoul (KR); Hyojin Ko, Seoul (KR); Junyoung Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/583,078

(22) Filed: Feb. 21, 2024

(65) Prior Publication Data
US 2024/0352990 A1    Oct. 24, 2024

(30) Foreign Application Priority Data

Apr. 20, 2023 (KR) .................. 10-2023-0051727

(51) Int. Cl.
| | |
|---|---|
| *F16H 3/46* | (2006.01) |
| *D06F 37/30* | (2020.01) |
| *F16H 57/021* | (2012.01) |
| *F16H 57/08* | (2006.01) |
| *F16H 63/30* | (2006.01) |
| *F16H 57/02* | (2012.01) |

(52) U.S. Cl.
CPC .............. *F16H 3/46* (2013.01); *D06F 37/304* (2013.01); *F16H 57/021* (2013.01); *F16H 57/082* (2013.01); *F16H 63/304* (2013.01); *F16H 2057/02034* (2013.01); *F16H 2057/02073* (2013.01); *F16H 2057/085* (2013.01); *F16H 2200/0034* (2013.01); *F16H 2200/2005* (2013.01); *F16H 2200/2094* (2013.01)

(58) Field of Classification Search
CPC .................. D06F 37/304; D06F 37/36; F16H 2057/02034; F16H 2200/0034; F16H 2200/2094
See application file for complete search history.

(56) References Cited

U.S. PATENT DOCUMENTS

| | | | |
|---|---|---|---|
| 10,927,490 B2 * | 2/2021 | Aruga | ..................... D06F 37/40 |
| 2004/0139768 A1 * | 7/2004 | Kim | ....................... D06F 37/40 68/24 |
| 2017/0096765 A1 | 4/2017 | Yu et al. | |

FOREIGN PATENT DOCUMENTS

| | | |
|---|---|---|
| CN | 203923701 U | 11/2014 |
| GB | 991437 A | 5/1965 |

OTHER PUBLICATIONS

Extended European Search Report in European Appln. No. 24159844.0, mailed on Aug. 1, 2024, 5 pages.

* cited by examiner

*Primary Examiner* — Derek D Knight
(74) *Attorney, Agent, or Firm* — Fish & Richardson P.C.

(57) ABSTRACT

A planetary gear assembly includes a carrier shaft supported on a drum shaft by a first fastening member; a coupling shaft including a first shaft portion in the carrier shaft and a first flange portion fixed to the carrier shaft by a second fastening member, a carrier including a second shaft portion in the first shaft portion and a second flange portion positioned at a back side of the first flange portion of the coupling shaft, a sun gear supported on the coupling shaft and supported on a rotor frame by a third fastening member, pinion gears coupled to the second flange portion and tooth-coupled with the sun gear, a ring gear tooth-coupled with the pinion gears, and a gear housing accommodating the sun gear, the pinion gears, and the ring gear.

20 Claims, 11 Drawing Sheets

WASHING MACHINE DRIVING SYSTEM AND A WASHING MACHINE WITH THE SAME

CROSS-REFERENCE TO RELATED APPLICATION

This application claims priority to and the benefit of Korean Patent Application No. 10-2023-0051727, filed in the Korean Intellectual Property Office, on Apr. 20, 2023.

BACKGROUND OF THE INVENTION

Field of the Invention

The present disclosure relates to a washing machine driving system with a planetary gear assembly and a clutch assembly and a washing machine with the same.

Description of the Related Art

The washing machine is driven in two main operating modes with different operating conditions, for example, a washing mode (which may include a rinsing mode) and a spin-drying mode.

Therefore, in order to satisfy both of the above two main operating modes, the washing machine is provided with a planetary gear assembly and a clutch assembly, and drives an drum shaft at low speed and high torque with a gear ratio of n:1 (washing mode), or drives the drum shaft at high speed and low torque with a gear ratio of 1:1 (spin-drying mode).

Here, the drum shaft refers to a shaft coupled to a drum to rotate the drum.

In the case of driving the drum shaft at low speed and high torque with a gear ratio of n:1, it can be referred to as "deceleration mode", and in the case of driving the drum shaft at high speed and low torque with a gear ratio of 1:1, it can be referred to as "direct connection mode".

That is, in a normal washing machine, a washing mode (which may include a rinsing mode) is performed by operating the drum shaft at low speed and high torque, and after the washing mode ends, the motor is temporarily stopped, and a draining operation is performed. And, after the draining operation ends, a spin-drying mode starts.

However, the drum shaft must be operated at high speed and low torque in the spin-drying mode.

Therefore, the washing machine driving system includes parts for shifting a rotational force of the motor transmitted to the drum shaft between the washing mode and the spin-drying mode, for example, the planetary gear assembly and the clutch assembly.

As an example of a related art related to the present disclosure, Korean Patent Publication No. KR10-2020-0106555 (hereinafter, referred to as "Related Art 1") and Korean Patent Publication No. KR10-2020-0089604 (hereinafter, referred to as "Related Art 2") disclose a washing machine driving system in which the drum shaft is installed to pass through a carrier and a sun gear shaft of a planetary gear assembly.

However, since the diameter of the sun gear accommodating the drum shaft increases in the washing machine driving system of the Related Art 1 and Related Art 2, there is a problem that the reduction ratio is small.

As another example of a related art related to the present disclosure, Korean Patent Publication No. KR10-2004-0065839 (hereinafter, referred to as "Related Art 3") discloses a washing machine driving system in which a planetary gear assembly and a clutch assembly are arranged in series on an axis of a drum shaft.

However, the washing machine driving system of the Related Art 3 has a problem that the volume of the drum is reduced due to the planetary gear assembly and the clutch assembly arranged in series on the shaft of the drum shaft.

As still another example of a related art related to the present disclosure, Korean Patent Registration Publication No. KR10-0210517 (hereinafter, referred to as "Related Art 4") discloses a washing machine driving system formed by separating the sun gear of the planetary gear assembly from the drum shaft of the drum assembly.

However, the washing machine driving system of the Related Art 4 has an inconvenience of having to fasten the drum shaft and the sun gear inside the drum assembly.

RELATED ART DOCUMENTS

Patent Document

Related Art 1: Korean Patent Publication No. KR 10-2020-0106555
Related Art 2: Korean Patent Publication No. KR 10-2020-0089604
Related Art 3: Korean Patent Publication No. KR 10-2004-0065839
Related Art 4: Korean Patent Registration Publication No. KR 10-0210517

SUMMARY OF THE INVENTION

A technical problem to be solved by the present disclosure is to provide a washing machine driving system capable of solving at least one of the above problems.

Another technical problem to be solved by the present disclosure is to provide a washing machine driving system in which a drum shaft and the motor are separated, a planetary gear assembly is placed therebetween. According to the washing machine driving system, a size of a sun gear is not affected by a size of an outer diameter of a drum shaft.

Still another technical problem to be solved by the present disclosure is to provide a washing machine driving system in which a carrier shaft is coupled to a back side end of the drum shaft, a coupling shaft is serration-coupled to the carrier shaft, and a second shaft portion of a carrier provided in the planetary gear assembly is serration-coupled to the coupling shaft.

Still another technical problem to be solved by the present disclosure is to provide a washing machine driving system capable of effectively implementing a high reduction ratio region while having a compact size and using a small motor.

Still another technical problem to be solved by the present disclosure is to provide a washing machine driving system capable of securing the volume of the drum to the maximum.

Still another technical problem to be solved by the present disclosure is to provide a washing machine driving system capable of securing assembly efficiency.

Still another technical problem to be solved by the present disclosure is to provide a washing machine driving system capable of minimizing a space required for the arrangement of the planetary gear assembly and the clutch assembly for manipulating it.

Still another technical problem to be solved by the present disclosure is to provide a front-loading type washing machine having the above-mentioned washing machine driving system.

The technical problems to be achieved from the present disclosure are not limited to the technical problems mentioned above, and other technical problem which are not mentioned above can be clearly understood from the following description by those skilled in the art to which the present disclosure pertains.

A planetary gear assembly included in a washing machine driving system of the present disclosure, may comprise a carrier shaft fixedly supported on a back end of a drum shaft by a first fastening member; a coupling shaft including a first shaft portion inserted into the carrier shaft and a first flange portion fixed to a back end of the carrier shaft by a second fastening member, and fixedly supported on the carrier shaft; a carrier including a second shaft portion inserted into the first shaft portion of the coupling shaft and a second flange portion positioned at a back side of the first flange portion of the coupling shaft, and fixedly supported on the coupling shaft; a sun gear rotationally supported on the coupling shaft and fixedly supported on a rotor frame of a motor by a third fastening member; a plurality of pinion gears coupled to the second flange portion of the carrier, and tooth-coupled with the sun gear; a ring gear tooth-coupled with the plurality of pinion gears; and a gear housing accommodating the sun gear, the plurality of pinion gears, and the ring gear therein.

Here, "tooth coupling" refers to a state in which teeth of a gear portion provided in a corresponding gear are engaged with each other and coupled to each other.

According to the washing machine driving system according to the present disclosure, a carrier shaft, which is unrelated to the reduction ratio of the planetary gear assembly, is fixedly supported on the drum shaft, and the sun gear, which is related to the reduction ratio of the planetary gear assembly, is rotationally supported on a coupling shaft that rotates integrally with the carrier shaft.

Therefore, since the sun gear, which is related to the reduction ratio of the planetary gear assembly, can be miniaturized, it is possible to compact the planetary gear assembly, and effectively implement a high reduction ratio region while using a small motor.

In addition, the motor and the planetary gear assembly may be assembled and separated at the back side of the washing machine, so it is possible to improve assembly efficiency.

The first fastening member may include a first head portion, the third fastening member may include a second head portion, and the first head portion of the first fastening member and the second head portion of the third fastening member may face each other in an inner space of the carrier shaft.

According to this configuration, since the first head portion of the first fastening member and the second head portion of the third fastening member are positioned in the inner space of the carrier shaft, it is possible to more compactly form the planetary gear assembly.

A front end of the sun gear may be spaced apart from the back end of the drum shaft in an axial direction.

Therefore, even if the outer diameter of the drum shaft is large, the size of the sun gear, which is related to the reduction ratio of the planetary gear assembly, can be formed regardless of the size of the drum shaft, so that it is possible to downsize the sun gear, and accordingly, it is possible to downsize the planetary gear assembly.

The washing machine driving system according to the present disclosure, may further comprise a bearing assembly including a bearing housing in which the gear housing is fixedly supported; a clutch coupled to the gear housing to be slidable toward a front side and a back side along the axial direction of the drum shaft, and integrally rotating with the gear housing; and a clutch driving portion moving the clutch toward the front side or the back side.

The planetary gear assembly and the clutch may be positioned in an inner space formed by a stator provided in a motor.

According to the present disclosure, since the planetary gear assembly and the clutch may be disposed in the inner space of the stator, it is possible to compact the washing machine driving system, and it is possible to secure the volume of the drum to the maximum.

The bearing assembly may further include a first support bearing accommodated inside the bearing housing, the first support bearing may include a first bearing positioned between the bearing housing and the drum shaft to rotationally support the drum shaft, a second bearing positioned between the bearing housing and the carrier shaft to rotationally support the carrier shaft, and a third bearing positioned between the bearing housing and the gear housing to support the gear housing.

According to this configuration, it is possible to effectively support the drum shaft, the carrier shaft, and the gear housing.

The gear housing of the planetary gear assembly may be coupled to the bearing housing by the third bearing.

According to this configuration, it is possible to effectively support the gear housing.

The washing machine driving system may further comprise a second support bearing supporting the sun gear and the third fastening member, and the second support bearing may include a fourth bearing positioned between the coupling shaft and the sun gear, and a fifth bearing positioned between the gear housing and the sun gear.

A front end of the second head portion of the third fastening member may be positioned forward a front end of the first shaft portion of the coupling shaft in the axial direction, and a forward movement of the fourth bearing in the axial direction may be restrained by the second head portion of the third fastening member.

According to this configuration, it is possible to effectively support the coupling shaft and the sun gear.

A back side end of the third fastening member may be fixed to the rotor frame by a fourth fastening member screwed to the third fastening member, and the third fastening member and the sun gear may rotate integrally with the rotor frame.

According to this configuration, it is possible to effectively assemble the planetary gear assembly and the motor at the back side of the washing machine.

The clutch may include a plurality of coupling protrusions at front side and back side ends, respectively, and the bearing housing and the rotor frame each may include a protrusion coupling portion coupled to the plurality of coupling protrusions when the clutch moves toward the front side or the back side.

According to this configuration, since the power transmission path can be adjusted by engaging the clutch with the bearing housing or the rotor frame, the installation space for the clutch can be minimized.

The clutch driving portion may include a clutch motor positioned in a direction perpendicular to the axial direction and coupled to the tub; a drawer coupled to the clutch motor and moving in a direction perpendicular to the axial direction by the clutch motor; a lifter including an arm portion in contact with a back side end of the clutch and moving in the axial direction according to the movement of the drawer; and a return spring positioned between the clutch and the gear housing and applying the clutch pressure toward the back side in the axial direction.

According to this configuration, since a clutch link structure can be formed by simple linear motion of the drawer in a direction perpendicular to the axial direction within a narrow space between the motor and the planetary gear assembly, it is possible to minimize the installation space of the clutch driving portion.

The clutch driving portion may further include a holder for supporting the drawer and the lifter.

According to this configuration, it is possible to effectively support the drawer and the lifter.

The drawer and the lifter each may include an inclined portion for moving the lifter in the axial direction according to the movement of the drawer.

According to this configuration, it is possible to effectively transmit the power of the clutch motor to the clutch.

The lifter may include a guide, and a stator may include a guide insert portion into which the guide is inserted.

According to this configuration, it is possible to effectively support the axial movement of the lifter.

The stator or the lifter may include a moment preventing portion for preventing rotational moment from being applied to the guide when the lifter moves in the axial direction.

According to this configuration, it is possible to effectively transmit the power of the clutch motor to the clutch.

Each of the sun gear, the ring gear, and the plurality of pinion gears may include a helical gear.

According to this configuration, it is possible to increase the safety factor of the gears provided in the planetary gear assembly, and reduce operating noise generated during gear rotation.

The washing machine according to the present disclosure may include a washing machine driving system having the above configuration.

Therefore, it is possible to maximize the volume of the drum and improve the assembly efficiency.

According to the present disclosure, since the drum shaft and the motor are separated, and the planetary gear assembly is disposed between the drum shaft and the motor, it is possible to form the size of the sun gear provided in the planetary gear assembly regardless of the size of the outer diameter of the drum shaft.

Therefore, since the size of the sun gear can be reduced, it is possible to compact the planetary gear assembly. In addition, it is possible to effectively implement a high reduction ratio region while using a small motor. Accordingly, it is possible to down-sizing the motor and motor driving circuit.

In addition, since the volume of the drum can be secured as much as the size of the planetary gear assembly is reduced, it is possible to maximize the volume of the drum and improve the assembly efficiency.

In addition, since the carrier shaft is coupled to the back side end of the drum shaft, the coupling shaft is serration-coupled to the carrier shaft, and the second shaft portion of the carrier provided in the planetary gear assembly is serration-coupled to the coupling shaft, it is possible to reliably fix and support the carrier shaft, the coupling shaft, and the second shaft portion of the carrier.

In addition, it is possible to sufficiently secure the axial force necessary for moving the clutch even with a small-sized clutch motor.

In addition, it is possible to increase the safety factor of the gears provided in the planetary gear assembly.

In addition, it is possible to improve the durability and noise performance of the washing machine driving system and increase the driving efficiency.

In addition, it is possible to improve the assembly efficiency of the washing machine driving system.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included as a part of the detailed description to help the understanding of the present disclosure, provide embodiments of the present disclosure, and together with the detailed description, describe the technical features of the present disclosure.

DETAILED DESCRIPTION OF THE EMBODIMENTS

Figure 1:
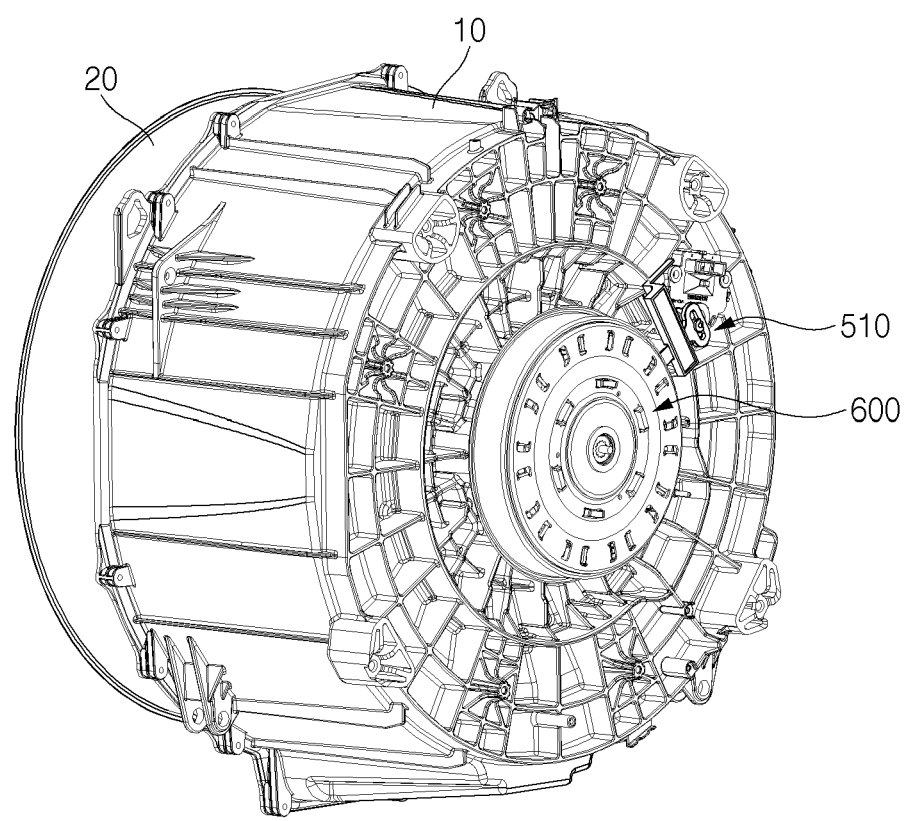
FIG. 1 is a perspective view showing a schematic configuration of a washing machine according to an embodiment of the present disclosure.

Hereinafter, embodiments disclosed in the present disclosure will be described in detail with reference to the accompanying drawings, however, regardless of the reference numerals, the same or similar components will be given the same reference numerals and redundant description thereof will be omitted.

The suffixes "assembly" and "unit" for elements used in the following description are given or mixed in consideration of only the ease of writing the specification, and do not have distinct meanings or roles by themselves.

In addition, in describing the embodiments disclosed in the present disclosure, when it is determined that the detailed description of the related known technology may obscure the subject matter of the embodiments disclosed in the present disclosure, the detailed description thereof will be omitted.

In addition, the accompanying drawings are only for easily understanding the embodiments disclosed in the present disclosure, the technical spirit disclosed in the present disclosure is not limited by the accompanying drawings, and it should be understood that the accompanying drawings include all changes, equivalents, and substitutes included in the spirit and scope of the present disclosure.

While terms, such as "first", "second", etc., may be used to describe various elements, such elements must not be limited by the above terms. The above terms are used only to distinguish one element from another.

When an element is referred to as being "coupled" or "connected" to another element, it may be directly coupled to or connected to the other element, however, it should be understood that other elements may exist in the middle.

On the other hand, when an element is referred to as being "directly coupled" or "directly assembled" to another element, it should be understood that there are no other elements in the middle.

The singular forms are intended to include the plural forms as well, unless the context clearly indicates otherwise.

In addition, in the present disclosure, it should be understood that the terms "comprise" and "have" specify the presence of stated features, integers, steps, operations, elements, parts, or combinations thereof, but do not preclude the presence or addition of one or more other features, integers, steps, operations, elements, parts, or combinations thereof.

Hereinafter, a preferred embodiment according to the present disclosure will be described in detail with reference to the accompanying drawings, however, regardless of the reference numerals, the same or similar elements will be given the same reference numerals and redundant description thereof will be omitted.

The washing machine according to an embodiment of the present disclosure is a so-called drum type washing machine. In addition, this washing machine is a so-called full-automatic washing machine, and is configured to automatically execute a series of washing processes including processes such as washing, rinsing, and spin-drying.

As shown in FIG. 1, a washing machine according to the present disclosure may be composed of a main body, a tub 10 (fixed tank), a drum 20 (rotating tank), a washing machine driving system, a controller (control device), and the like.

The controller may be composed of hardware such as a CPU and memory, and software such as a control program and various data. The controller may include at least one processor. The processor may be configured to execute program instructions maintained on memory.

The main body of the washing machine is a box-shaped container composed of panels or frames, and may constitute an exterior of the washing machine. A circular inlet for putting in and taking out laundry may be formed on the front of the main body.

A door having a transparent window may be installed in the inlet, and the inlet may be opened and closed by the door.

An operation unit having a switch, etc. operated by a user may be installed on the upper side of the inlet in the main body.

The tub 10 communicating with the inlet may be installed inside the main body. The tub 10 is made of a bottomed cylindrical container capable of storing water, and an opening of the tub 10 may communicate with the inlet.

A water supply device including a water supply pipe, a water supply valve, and a detergent injection unit may be provided at the upper part of the tub 10.

The drum 20 may be formed of a cylindrical container having a diameter slightly smaller than that of the tub 10, and may be accommodated in the tub 10 in a state in which the center line coincides with the tub 10.

The drum 20 may have a circular opening corresponding to the inlet, and laundry may be put into the drum 20 through the inlet and the circular opening. A plurality of dewatering holes may be formed throughout the entire circumference of the drum 20.

A driving system is installed on a back side of the tub 10. Here, the back side means a side where a motor is positioned, and means the right side based on FIGS. 2 and 3. In addition, a front side means a side where the tub 10 is positioned, and means the left side based on FIGS. 2 and 3.

Referring to FIGS. 2 to 6, the driving system may largely include a bearing assembly 100, a second bearing assembly 200, a planetary gear assembly 300, a clutch 400, a clutch driving portion 500, and a motor 600.

The drum 20 may be fixed to a front side end of a drum shaft 25 protruding through the tub 10. Thus, the drum 20 may be driven in a direct driving manner.

The bearing assembly 100 may be fixedly supported on the tub 10 toward the back side of the tub 10. The bearing assembly 100 may include a bearing housing 110 fixedly supported on the tub 10. The bearing housing 110 may have an inner space for accommodating the drum shaft 25.

Here, "fixed support" means that the tub 10 and the bearing assembly 100 are supported in a state in which relative rotation between them is impossible, that is, in a fixed state.

The bearing assembly 100 may include a first support bearing 120 accommodated inside the bearing housing 110.

The first support bearing 120 may include a first bearing 120a positioned between the bearing housing 110 and the drum shaft 25 to rotationally support the drum shaft 25, a second bearing 120b positioned between the bearing housing 110 and a carrier shaft 320 to rotationally support the carrier shaft 320, and a third bearing 120c positioned between the bearing housing 110 and a gear housing 350 to support the gear housing 350.

Here, "rotationally support" means that the drum shaft 25 is rotatably supported with respect to the bearing housing 110.

Therefore, the first support bearing 120 may effectively support the drum shaft 25 and the planetary gear assembly 300.

The carrier shaft 320 may be fastened and supported by a first fastening member 311 at a back side end of the drum shaft 25, and the carrier shaft 320 may rotate integrally with the drum shaft 25.

The first fastening member 311 may be formed of a screw inserted into an inner space of the carrier shaft 320 from a back side of the carrier shaft 320 and fastening the carrier shaft 320 to the drum shaft 25.

A first head portion 311a of the first fastening member 311 may be positioned in the inner space of the carrier shaft 320.

A front end of the carrier shaft 320 may be inserted into a back end of the drum shaft 25.

To this end, a groove of a certain depth may be formed at the back end of the drum shaft 25, and a protrusion inserted into the groove of the drum shaft 25 may be provided at the front end of the carrier shaft 320.

Splines or serrations may be provided on an inner circumferential surface of the groove formed at the back end of the drum shaft 25 and an outer circumferential surface of the protrusion formed at the front end of the carrier shaft 320, respectively.

According to this configuration, the carrier shaft 320 can be fixedly supported to the drum shaft 25 more reliably.

In addition, when splines or serrations each are formed on the inner circumferential surface of the groove formed at the back end of the drum shaft 25 and the outer circumferential surface of the protrusion formed at the front end of the carrier shaft 320, optionally, the first fastening member may be omitted.

A coupling shaft 330 may be fastened and fixedly supported at a back side end of the carrier shaft 320 by a second fastening member 313, and the coupling shaft 330 may rotate integrally with the carrier shaft 320.

The coupling shaft 330 may include a first shaft portion 330a inserted into the carrier shaft 320, and a first flange portion 330b fixed to a back end of the carrier shaft 320 by the second fastening member 313.

Splines or serrations may be provided on an outer circumferential surface of the first shaft portion 330a of the coupling shaft 330 and an inner circumferential surface of the carrier shaft 320 into which the first shaft portion 330a is inserted, respectively.

According to this configuration, the coupling shaft 330 can be fixedly supported to the carrier shaft 320 more reliably.

The second fastening member 313 may be made of a screw.

A carrier 340 may be coupled to and fixedly supported on the coupling shaft 330.

The carrier 340 may include a second shaft portion 340a inserted into the first shaft portion 330a of the coupling shaft 330, and a second flange portion 340b positioned on a back side of the first flange portion 330b of the coupling shaft 330.

Splines or serrations may be provided on a part of an outer circumferential surface of the second shaft portion 340a of the carrier 340 and an inner circumferential surface of the first shaft portion 330a of the coupling shaft 330, respectively.

According to this configuration, the carrier 340 can be fixedly supported to the coupling shaft 330 more reliably.

The carrier 340 may rotate integrally with the coupling shaft 330, the carrier shaft 320 and the drum shaft 25.

The planetary gear assembly 300 may further include the gear housing 350, a sun gear 360 accommodated inside the gear housing 350, a ring gear 370, and a plurality of pinion gears 380, in addition to the carrier shaft 320, the coupling shaft 330, and the carrier 340.

The sun gear 360 may be rotationally supported on the coupling shaft 330 and fixedly supported on a rotor frame 610 of the motor 600 by a third fastening member 315.

The third fastening member 315 may penetrate the sun gear 360 in an axial direction and may rotate integrally with the sun gear 360. The third fastening member 315 may be formed of a bolt.

A second head portion 315a of the third fastening member 315 may be positioned in the inner space of the carrier shaft 320, and face the first head portion 311a of the first fastening member 311, and a front end of the second head part 315a may be positioned in front of a front end of the first shaft portion 330a of the coupling shaft 330.

When the sun gear 360 is coupled to the coupling shaft 330 using the third fastening member 315, since the motor 600 and the planetary gear assembly 300 may be assembled and separated on the back side for easy visibility, assembly efficiency can be improved.

In the inner space of the carrier shaft 320, a front end of the sun gear 360 may be spaced apart from a back end of the first fastening member 311, that is, the first head portion 311a of the first fastening member 311.

Therefore, the front end of the sun gear 360 is spaced apart from the back end of the drum shaft 25 in the axial direction.

Specifically, the carrier shaft 320 is fixedly supported on the back end of the drum shaft 25, the coupling shaft 330 is fixedly supported on the carrier shaft 320, and the third fastening member 315 and the sun gear 360 are rotationally supported on the coupling shaft 330.

In this way, since the front end of the sun gear 360 is spaced apart from the back end of the drum shaft 25, it is possible to downsize the sun gear 360 related to the reduction ratio of the planetary gear assembly 300.

Therefore, it is possible to compact the planetary gear assembly 300, and it is possible to effectively implement a high reduction ratio region while using a small motor.

The sun gear 360 and the third fastening member 315 may be supported by a second support bearing 700.

The second support bearing 700 may include a fourth bearing 710 positioned between the coupling shaft 330 and the sun gear 360, and a fifth bearing 720 positioned between the gear housing 350 and the sun gear 360.

The first shaft portion 330a of the coupling shaft 330 may include a seating portion for seating the fourth bearing 710 thereon.

The second head portion 315a of the third fastening member 315 may be in contact with the fourth bearing 710.

A back end of the sun gear 360 may be coupled to the rotor frame 610 of the motor 600 by a fourth fastening member 317 screwed to a back end of the third fastening member 315.

The ring gear 370 may be positioned on an inner wall of the gear housing 350, and may be fixedly supported on the gear housing 350.

The plurality of pinion gears 380 may be coupled to the second flange portion 340b of the carrier 340.

The plurality of pinion gears 380 coupled to the second flange portion 340b of the carrier 340 may rotate or revolve depending on whether the second flange portion 340b of the carrier 340 rotates in a state in which they are tooth-coupled to the sun gear 360 and the ring gear 370, respectively.

Here, "tooth coupling" refers to a state in which teeth of the gear portion provided in the corresponding gear are engaged with each other and coupled to each other.

For example, in a state in which the second flange 340b of the carrier 340 is fixed, the plurality of pinion gears 380 each may rotate, but cannot revolve. In addition, in a state in which the second flange portion 340*b* of the carrier 340 rotates, the plurality of pinion gears 380 may revolve, or rotate and revolve.

The gear housing 350 of the planetary gear assembly 300 may be coupled to the bearing housing 110 by the third bearing 120*c*.

According to this configuration, the planetary gear assembly 300 is limited in movement in the axial direction. Therefore, if the sun gear 360, the ring gear 370, and the plurality of pinion gears 380 each have a helical gear, the safety factor of the gears provided in the planetary gear assembly 300 can be increased, and the operating noise generated during gear rotation can reduced.

The motor 600 may include the rotor frame 610 to which a back side end of the sun gear 330 is fixedly coupled, a stator 620 positioned in an inner space of the rotor frame 610, and a plurality of permanent magnets 630 positioned inside the rotor frame 610 and rotating the rotor frame 610 by interaction with the stator 620.

Therefore, when the motor 600 operates and the rotor frame 610 rotates, the sun gear 330 fixed to the rotor frame 610 rotates, and the drum shaft rotates according to the rotation of the sun gear 330.

At this time, the drum shaft 25 may rotate at low speed and high torque or at high speed and low torque, which will be described later.

The rotor frame 610 has a space for accommodating the stator 620 and the plurality of permanent magnets 630 therein.

The stator 620 disposed in the inner space of the rotor frame 610 may be fixed to the bearing housing 110 of the bearing assembly 100, and has an inner space accommodating the planetary gear assembly 300.

That is, the planetary gear assembly 300, in particular, the gear housing 320 is positioned in the inner space formed by the stator 620.

The clutch 400 for converting a power transmission path through the planetary gear assembly 300 may be positioned in the inner space formed by the stator 620.

That is, the clutch 400 may be coupled to the gear housing 320 to be slidable toward front side and the back side along the axial direction of the drum shaft.

Figure 9:
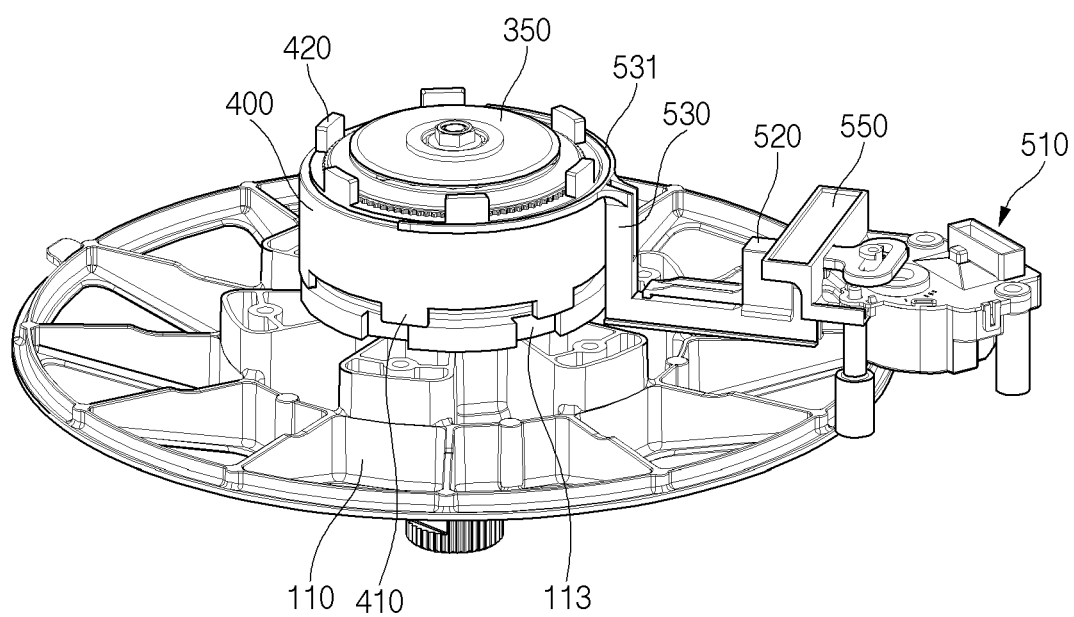
FIG. 9 is a perspective view showing a schematic configuration of a clutch and a clutch driving portion provided in a washing machine driving system according to an embodiment of the present disclosure.
Figure 10:
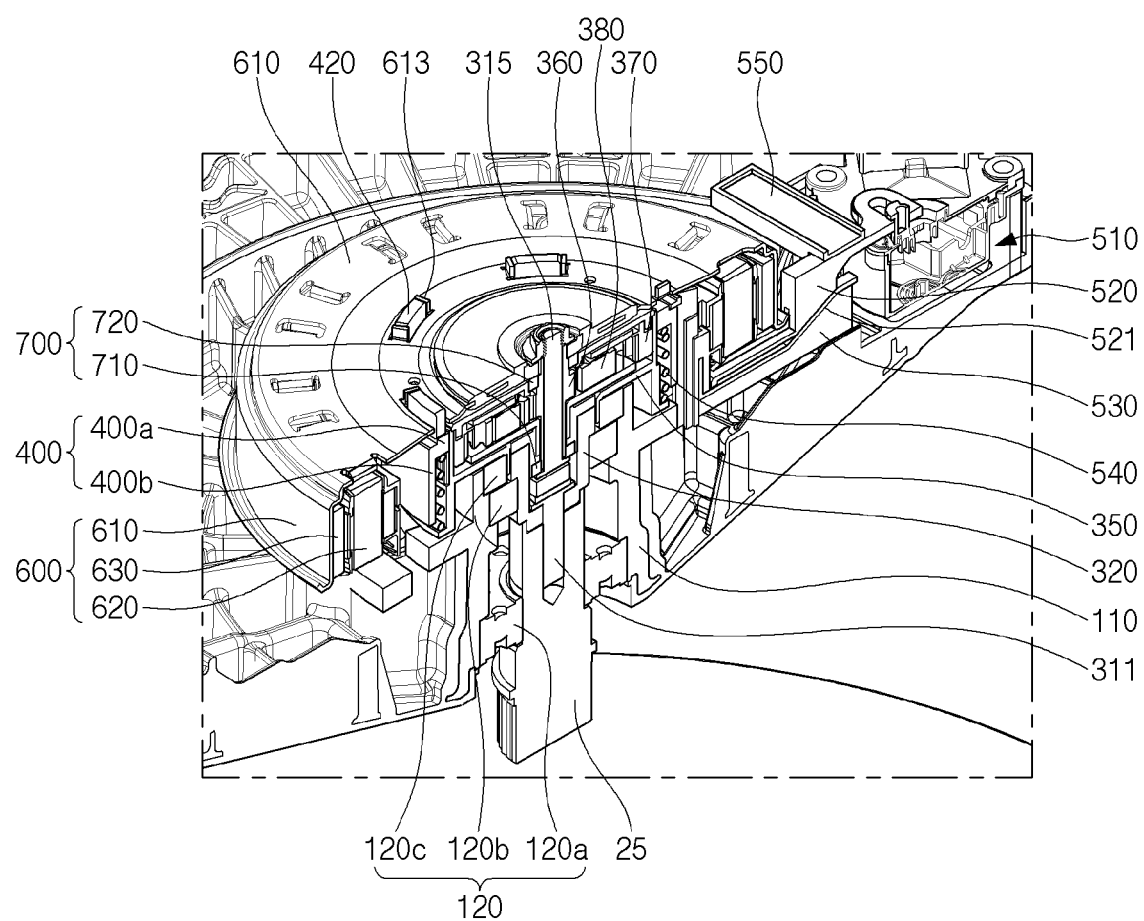
FIG. 10 is a cross-sectional perspective view showing a main part configuration when a washing machine driving system according to an embodiment of the present disclosure operates in a washing mode.
Figure 11:
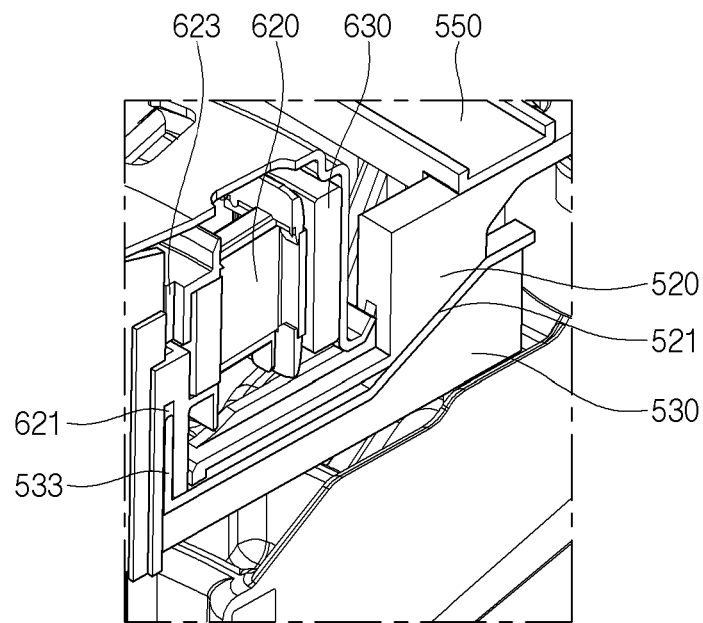
FIG. 11 is a cross-sectional perspective view showing a detailed configuration of a clutch and a clutch driving portion provided in a washing machine driving system according to an embodiment of the present disclosure.

Referring to FIGS. 9 to 11, the clutch 400 is formed of two-stage bodies 400*a* and 400*b* having different diameters, and splines or serrations may be provided on an inner circumferential surface of a first body 400*a* having a relatively small diameter and an outer circumferential surface of the gear housing 320, respectively.

In addition, a return spring 540 of the clutch driving portion 500 is positioned between the inside of a second body 400*b* having a relatively larger diameter than the first body 400*a* and the outer surface of the gear housing 320, and between the second body 400*b* and the outer surface of the second bearing housing 210.

Therefore, the clutch 400 may rotate integrally with the gear housing 320, and may move forward and backward along the axial direction.

The clutch 400 may include a plurality of coupling protrusions 410 and 420 at front side end and back side end, respectively.

The coupling protrusion 410 at the front side end may be formed at a front side end of the second body 400*b*, and the coupling protrusion 420 at the back side end may be formed at a back side end of the first body 400*a*.

The bearing housing 110 may include a protrusion coupling portion 113 coupled to the plurality of coupling protrusions 410 when the clutch 400 moves forward along the axial direction, and the rotor frame 610 may include a protrusion coupling portion 613 coupled to the plurality of coupling protrusions 420 when the clutch 400 moves backward along the axial direction.

Figure 2:
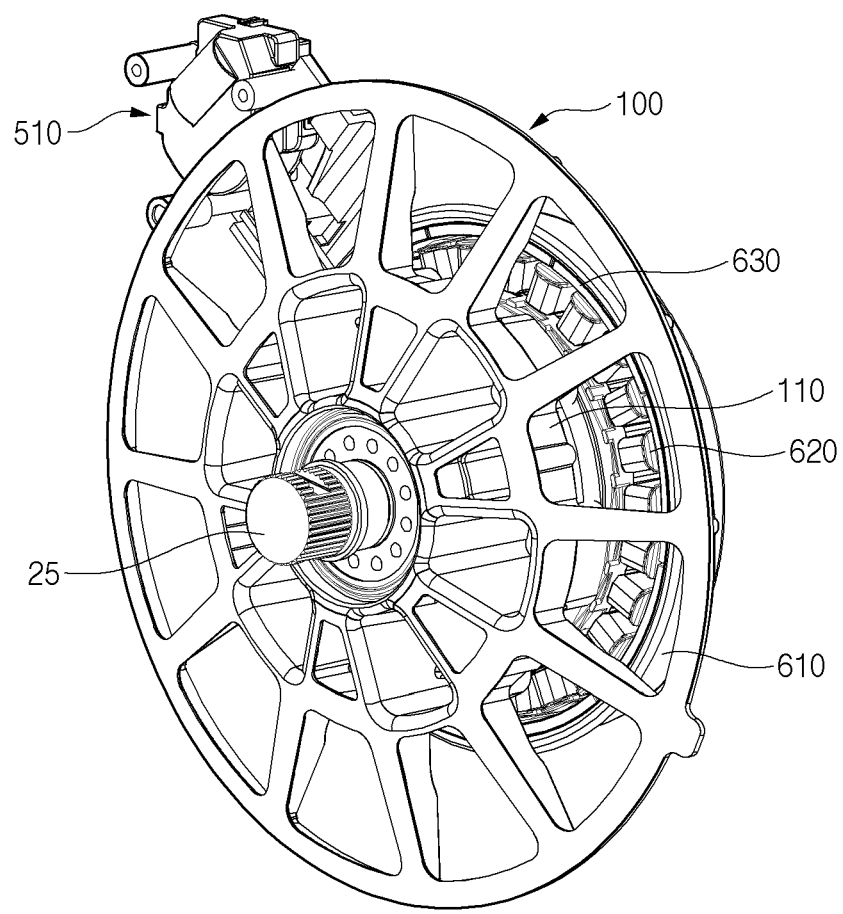
FIG. 2 is a front side perspective view showing a schematic configuration of a washing machine driving system according to an embodiment of the present disclosure.

A method of driving the washing machine having the driving system according to this configuration will be described with reference to FIGS. 2 and 3.

Figure 3:
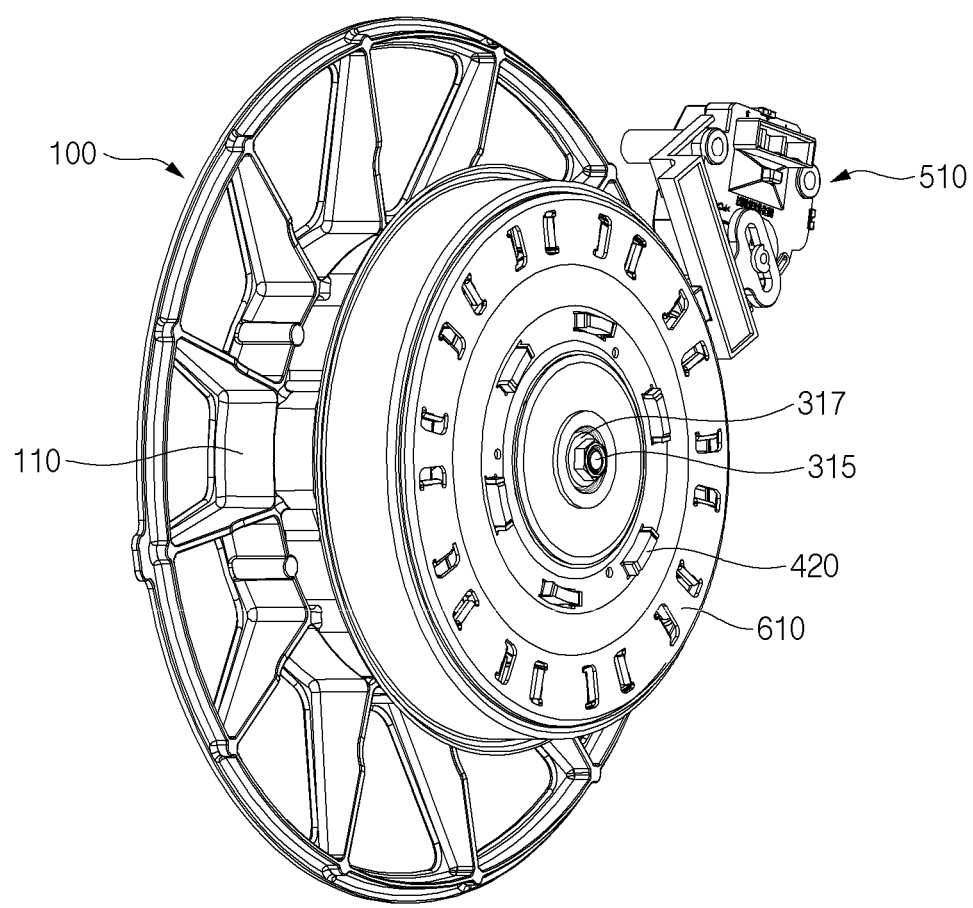
FIG. 3 is a back side perspective view showing a schematic configuration of a washing machine driving system according to an embodiment of the present disclosure.
Figure 4:
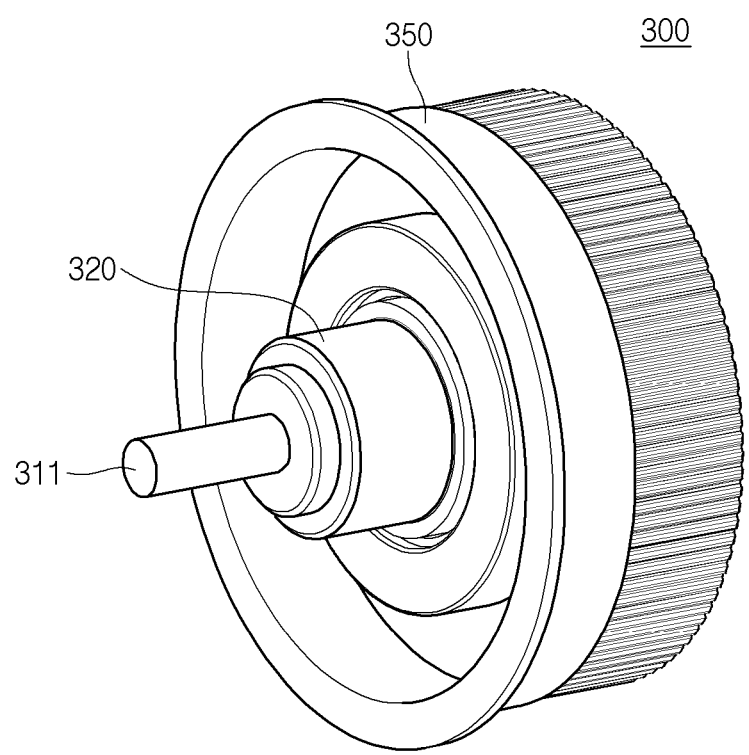
FIG. 4 is a front side perspective view showing a schematic configuration of a planetary gear assembly provided in a washing machine driving system according to an embodiment of the present disclosure.
Figure 5:
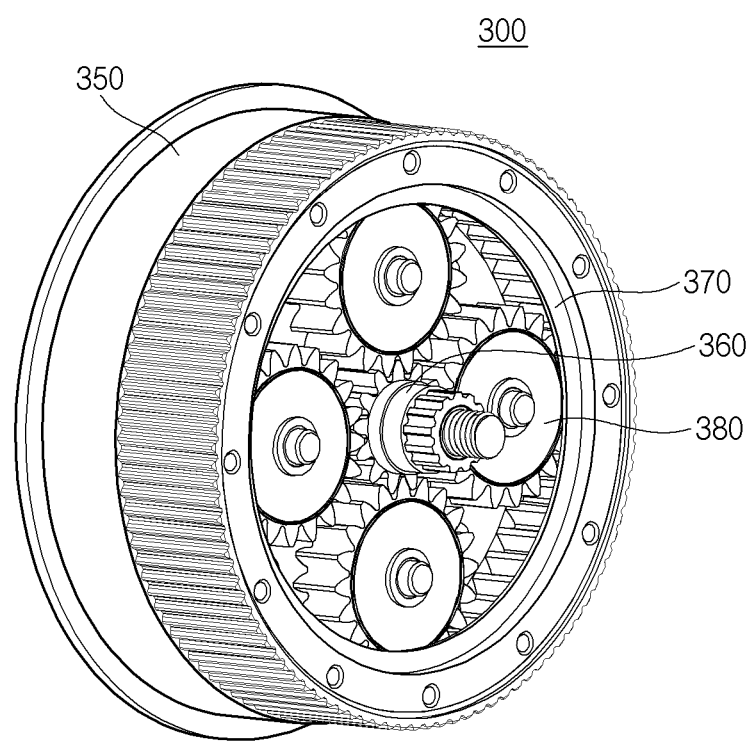
FIG. 5 is a back side perspective view showing a schematic configuration of a planetary gear assembly provided in a washing machine driving system according to an embodiment of the present disclosure.
Figure 6:
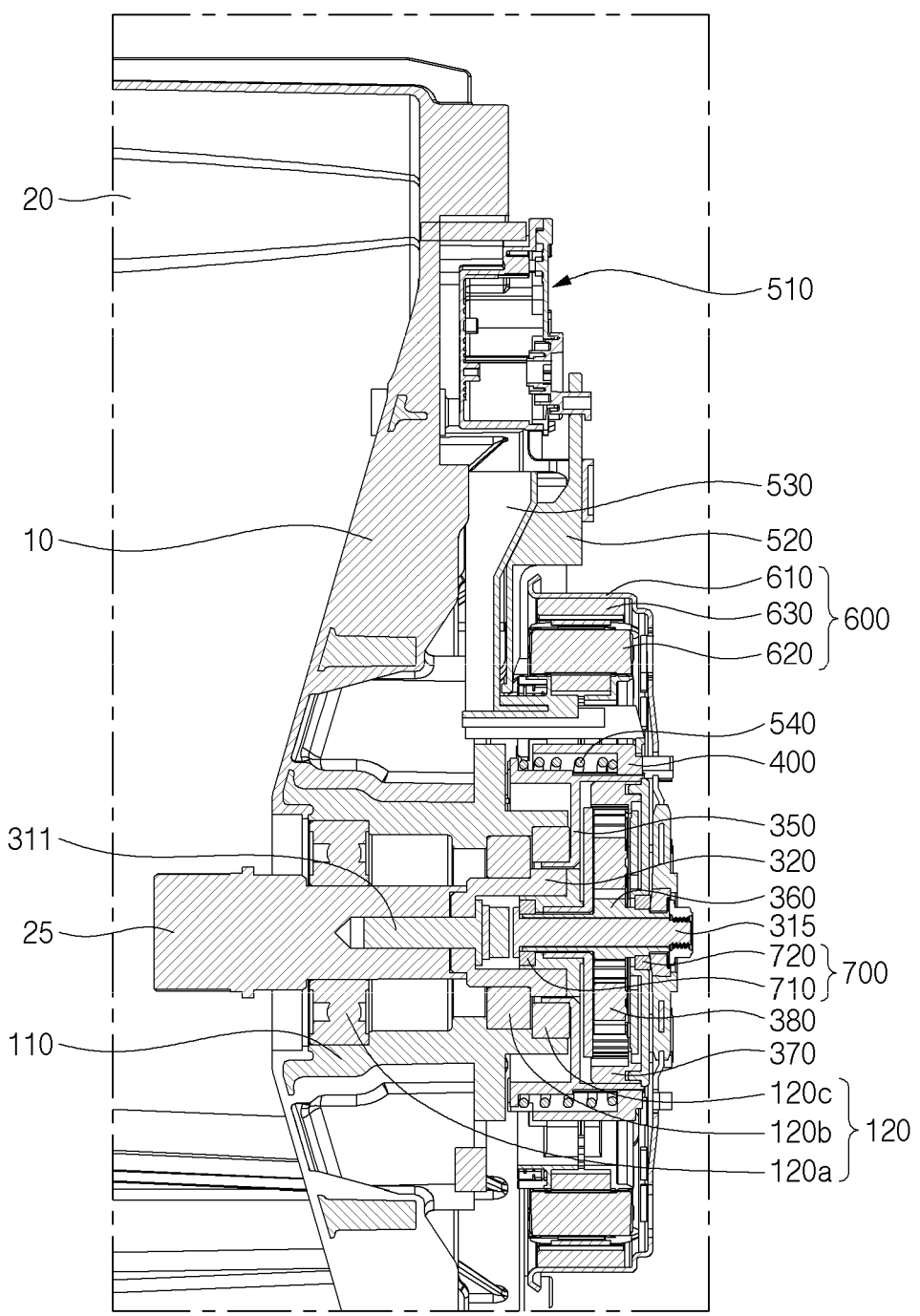
FIG. 6 is a cross-sectional view showing a main part configuration when a washing machine driving system according to an embodiment of the present disclosure operates in a spin-drying mode.
Figure 7:
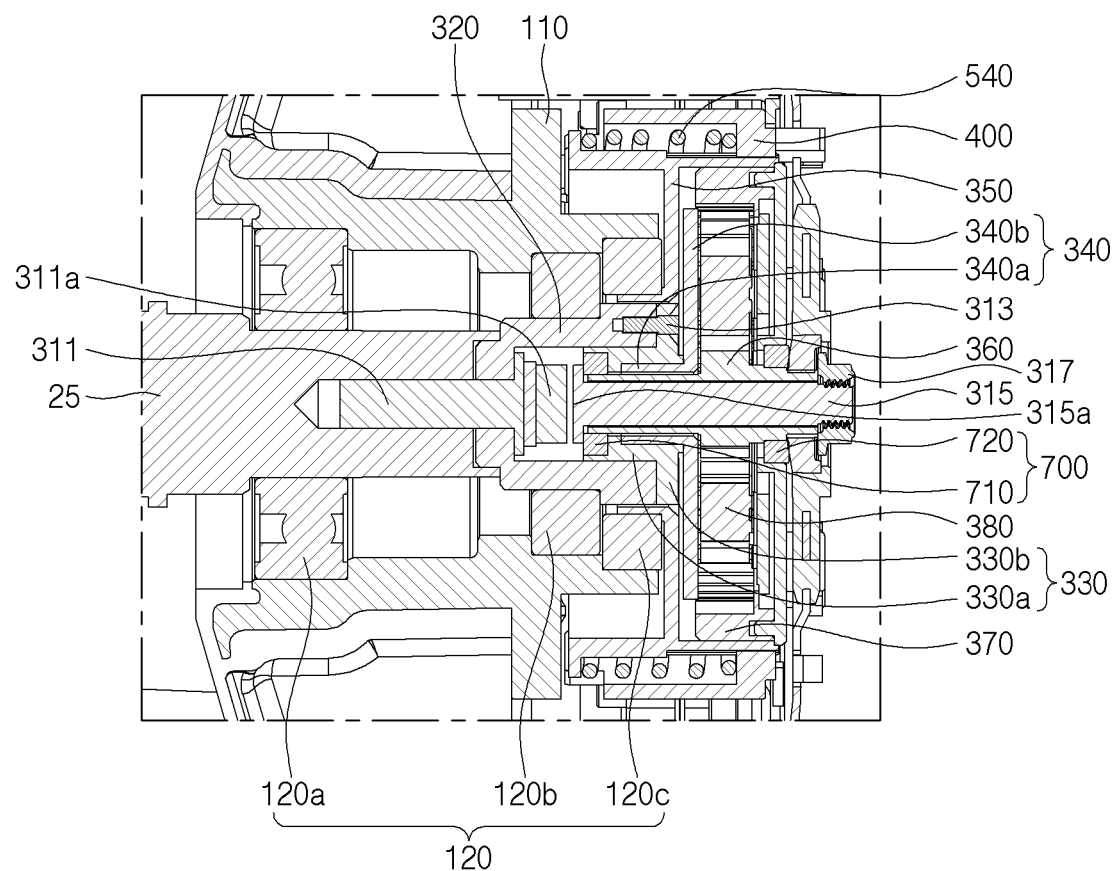
FIG. 7 is an enlarged cross-sectional view showing a main part configuration of a washing machine driving system according to an embodiment of the present disclosure.
Figure 8:
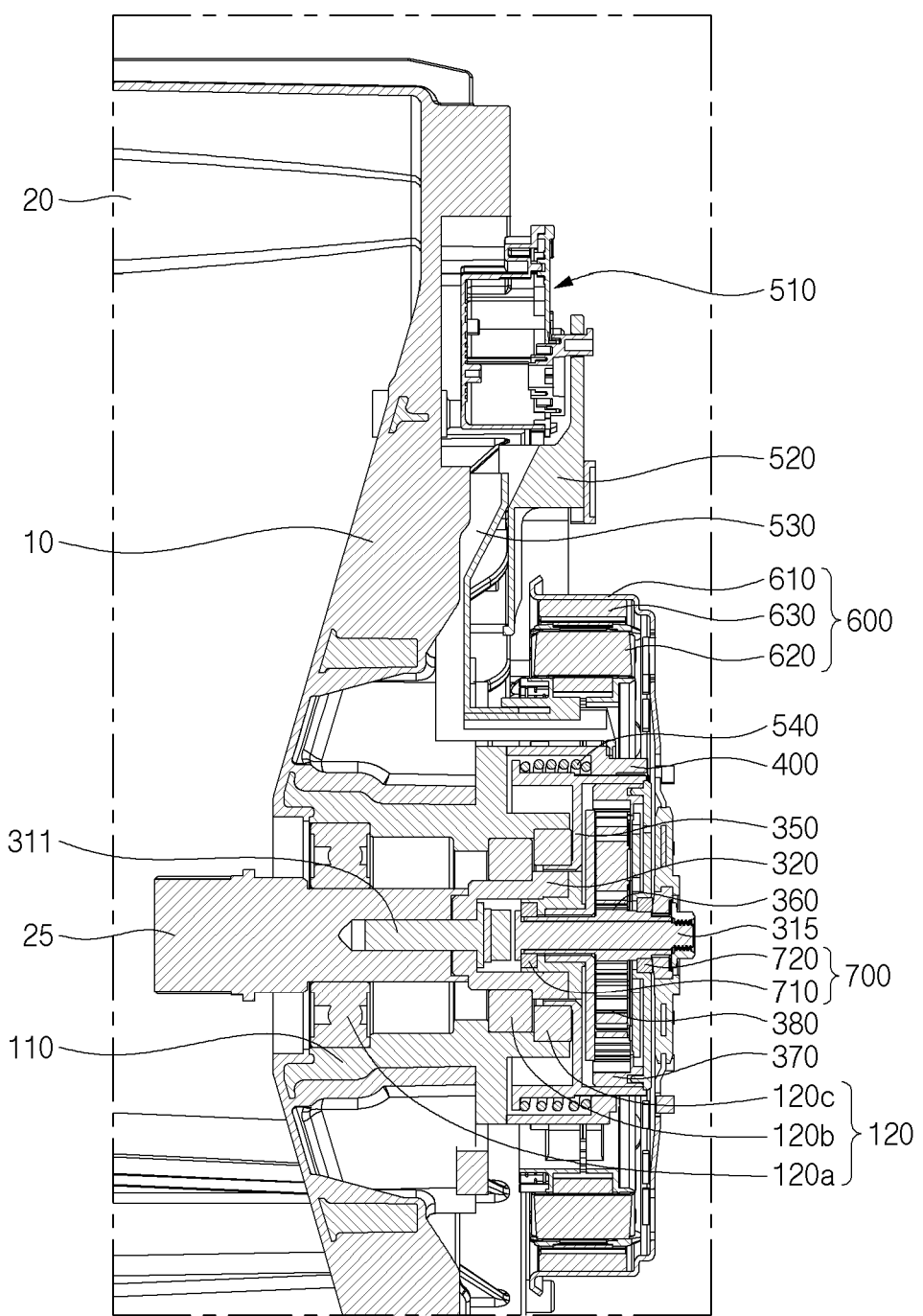
FIG. 8 is a cross-sectional view showing a main part configuration when a washing machine driving system according to an embodiment of the present disclosure operates in a washing mode.

When the clutch 400 moves forward and the coupling protrusion 410 at the front side end of the clutch 400 is coupled to the protrusion coupling portion 113 of the bearing housing 110 as shown in FIG. 3, rotation of the gear housing 320 to which the clutch 400 is coupled is restrained.

That is, since the bearing housing 110 is fixed to the tub 10, rotations of the bearing housing 110, the clutch 400 coupled to the bearing housing 110, and the gear housing 320 coupled to the clutch 400 are restrained.

Therefore, since the ring gear 340 is maintained in a fixed state, while the rotor frame 610 and the sun gear 330 rotate, the plurality of pinion gears 350 revolve around the sun gear 330 while rotating on their own, and the rotational force of the sun gear 330 is transmitted to the drum shaft 25 through the plurality of pinion gears 350 and the carrier 310 so that the drum shaft 25 is driven at low speed and high torque.

Then, when the clutch 400 moves to the back side and the coupling protrusion 420 of the clutch 400 is coupled to the protrusion coupling portion 613 of the rotor frame 610, the sun gear 330, the clutch 400, and the gear housing 320 to which the clutch 400 is coupled rotate integrally while the rotor frame 610 rotates.

Therefore, since the carrier 310 also rotates integrally with the gear housing 320, the rotational speed of the carrier 310 coincides with the rotational speed of the sun gear 330, and accordingly, the drum shaft 25 is driven at high speed and low torque.

According to this configuration, since the power transmission path may be adjusted by coupling the clutch 400 to the bearing housing 110 or the rotor frame 610, the clutch 400 may move within a narrow space. Therefore, the installation space of the clutch 400 can be minimized.

Since the planetary gear assembly 300 and the clutch 400 are disposed in the inner space of the stator 620, it is possible to compact the washing machine driving system and secure the maximum volume of the drum 20.

In order to be able to adjust the power transmission path by changing the position of the clutch 400 as described above, the washing machine drive system of the present disclosure further includes the clutch driving portion 500.

The clutch driving portion 500 may include a clutch motor 510, a drawer 520, a lifter 530, and a return spring 540.

The clutch motor 510 may be positioned in a direction perpendicular to the axial direction and may be coupled to the tub 10.

The drawer 520 may be coupled to the clutch motor 510 and may move in the direction perpendicular to the axial direction by the clutch motor 510. When the drawer 520 is moved, a part of the drawer 520 may be positioned between a space between the rotor frame 610 and the tub 10.

The lifter 530 has a C-type arm portion 531 that is in contact with a back side end of the clutch 400. It is also possible to have a ring-type arm portion instead of the C-type arm portion 531, and it is also possible to replace the C-type arm portion with another component capable of pressing the clutch 400 forward.

The lifter 530 may move in the axial direction according to the movement of the drawer 520.

To this end, the drawer 520 and the lifter 530 each may include an inclined portion 521 to allow the lifter 530 to move in the axial direction according to the movement of the drawer 520.

According to this configuration, it is possible to effectively transmit the power of the clutch motor 510 to the clutch 400.

The return spring 540 may be positioned inside the second body 400b of the clutch 400.

Therefore, the return spring 540 may be positioned between the clutch 400 and the gear housing 320 and between the clutch 400 and the second bearing housing 210, and press the clutch 400 toward the back side in the axial direction.

According to this configuration, since a clutch link structure may be formed by simple linear motion of the drawer 520 in the direction perpendicular to the axial direction within a narrow space between the motor 600 and the planetary gear assembly 300, it is possible to minimize an installation space of the clutch driving portion 500.

The clutch driving portion 500 may further include a holder 550 for supporting the drawer 520 and the lifter 530. According to this configuration, it is possible to effectively support the drawer 520 and the lifter 530 using the holder 550.

The lifter 530 may include a guide 533, and the stator 620 may include a guide insertion portion 621 into which the guide 533 is inserted.

According to this configuration, it is possible to effectively support the axial movement of the lifter 530.

In addition, the stator 620 may include a moment preventing portion 623 for preventing rotational moment from being applied to the guide 533 when the lifter 530 moves in the axial direction.

In the above, it has been described that the moment preventing portion 623 is provided in the stator 620 as an example, but the moment preventing portion may be provided in the lifter 530.

According to this configuration, it is possible to effectively prevent malfunction of the lifter, and it is possible to effectively transmit the power of the clutch motor 510 to the clutch 400.

According to this configuration, when the clutch motor 510 operates to pull the drawer 520 in the deceleration mode, the lifter 530 moves forward along the inclined portion 521 of the drawer 520, and the C-type arm portion 531 of the lifter 530 presses the clutch 400 forward, and accordingly, the return spring 540 mounted inside the clutch 400 in a compressed state is further compressed.

Then, the coupling protrusion 420 of the clutch 400 separates from the protrusion coupling portion 613 of the rotor frame 610 and is separated from each other. Subsequently, when power is applied to the motor 600 to slowly rotate the rotor frame 610, while the coupling protrusion 410 of the clutch 400 is forwardly inserted into the protrusion coupling portion 113 formed on the bearing housing 110, the rotation of the ring gear 340 is restrained.

In addition, in the direct connection mode, when the clutch motor 510 pushes the drawer 520, the lifter 530 moves rearward along the inclined portion 521 of the drawer 520 and the return spring 540 mounted inside the clutch 400 in a compressed state becomes less compressed.

Then, the coupling protrusion 410 of the clutch 400 separates from the protrusion coupling portion 113 of the bearing housing 110 and is separated from each other. Subsequently, when power is applied to the motor 600 to slowly rotate the rotor frame 610, the coupling protrusion 420 of the clutch 400 has a rotational degree of freedom while being inserted into the protrusion coupling portion 613 of the rotor frame 610 by the spring force of the return spring 540, and the ring gear 340 has a degree of rotational freedom while being integrated with the rotor frame 610.

According to the washing machine driving system of this configuration, after inserting the drum assembly including the drum shaft 25 into the bearing housing 110 fixed to the tub 10, and inserting the carrier shaft 320 into the second bearing 120b, coupling the carrier shaft 320 to the drum shaft 25 using the first fastening member 311, inserting the fourth bearing 710 into the coupling shaft 330, coupling the coupling shaft 330 to the carrier shaft 320 using the second coupling member 313 while the third coupling member 315 is inserted into the coupling shaft 330, mounting the motor 600 on a back side of the planetary gear assembly 300, and fastening the fourth fastening member 317 to the third fastening member 315 may be performed sequentially. Thus, it is possible to complete the installation of the planetary gear assembly 300 and the motor 600 by sequentially performing the above operations.

Therefore, since it is possible to assemble the planetary gear assembly and the motor on the back side for easy visibility, the assembly efficiency can be improved.

In addition, the washing machine according to the present disclosure can maximize the volume of the drum.

It is apparent to those skilled in the art that the present disclosure may be embodied in other specific forms without departing from the essential characteristics of the present disclosure. Accordingly, the above detailed description should not be construed as restrictive in all respects but should be considered as illustrative. The scope of the present disclosure should be determined by reasonable interpretation of the appended claims, and all changes within the equivalent scope of the present disclosure are included in the scope of the present disclosure.

What is claimed is:

1. A washing machine driving system comprising:
    a motor comprising a rotor frame; and
    a planetary gear assembly comprising:
        a carrier shaft connected to a drum shaft,
        a first fastening member that couples the carrier shaft to a back end of the drum shaft and supports the carrier shaft and the drum shaft,
        a coupling shaft that is supported by the carrier shaft, the coupling shaft comprising (i) a first shaft portion inserted into the carrier shaft and (ii) a first flange portion fixed to a back end of the carrier shaft,
        a second fastening member that couples the first flange portion to the back end of the carrier shaft,
        a carrier that is supported by the coupling shaft, the carrier comprising (i) a second shaft portion inserted into the first shaft portion and (ii) a second flange portion disposed at a back side of the first flange portion,
        a sun gear that is rotatably coupled to the coupling shaft and supported by the rotor frame of the motor,
        a third fastening member that couples the sun gear to the rotor frame,
        a plurality of pinion gears coupled to the second flange portion of the carrier, the plurality of pinion gears being tooth-coupled to the sun gear,
        a ring gear that is tooth-coupled to the plurality of pinion gears, and
        a gear housing that accommodates the sun gear, the plurality of pinion gears, and the ring gear.

2. The washing machine driving system of claim 1, wherein the first fastening member comprises a first head portion disposed in an inner space of the carrier shaft,
- wherein the third fastening member comprises a second head portion disposed in the inner space of the carrier shaft, and
- wherein the first head portion and the second head portion face each other.

3. The washing machine driving system of claim 2, wherein a front end of the sun gear is spaced apart from the back end of the drum shaft in an axial direction of the drum shaft.

4. The washing machine driving system of claim 3, further comprising:
- a bearing assembly comprising a bearing housing, the bearing housing accommodating and supporting the gear housing;
- a clutch coupled to the gear housing and configured to move toward a front side and a back side along the axial direction, the clutch being configured to rotate with the gear housing; and
- a clutch driving portion configured to move the clutch toward the front side or the back side along the axial direction.

5. The washing machine driving system of claim 4, wherein the bearing assembly further comprises a first support bearing accommodated inside the bearing housing.

6. The washing machine driving system of claim 5, wherein the first support bearing comprises:
- a first bearing that is disposed between the bearing housing and the drum shaft and supports the drum shaft;
- a second bearing that is disposed between the bearing housing and the carrier shaft and supports the carrier shaft; and
- a third bearing that is disposed between the bearing housing and the gear housing and supports the gear housing.

7. The washing machine driving system of claim 6, wherein the third bearing couples the gear housing to the bearing housing.

8. The washing machine driving system of claim 6, further comprising a second support bearing that supports the sun gear and the third fastening member,
- wherein the second support bearing comprises:
  - a fourth bearing disposed between the coupling shaft and the sun gear; and
  - a fifth bearing disposed between the gear housing and the sun gear.

9. The washing machine driving system of claim 8, wherein a front end of the second head portion is disposed forward relative to a front end of the first shaft portion of the coupling shaft in the axial direction, and
- wherein the second head portion is configured to restrict a forward movement of the fourth bearing in the axial direction.

10. The washing machine driving system of claim 6, further comprising a fourth fastening member that couples a back side end of the third fastening member to the rotor frame, the fourth fastening member having a screw thread that is coupled to the third fastening member, and wherein the third fastening member and the sun gear are configured to rotate together with the rotor frame.

11. The washing machine driving system of claim 10, wherein the clutch comprises (i) a plurality of front coupling protrusions disposed at front end of the clutch and (ii) a plurality of back coupling protrusions disposed at back end of the clutch,
- wherein the bearing housing comprises a front protrusion coupling portion configured to couple to the plurality of front coupling protrusions based on the clutch moving toward the front side, and
- wherein the rotor frame comprises a back protrusion coupling portion configured to couple to the plurality of back coupling protrusions based on the clutch moving toward the back side.

12. The washing machine driving system of claim 11, wherein the clutch driving portion comprises:
- a clutch motor spaced apart from the clutch in a radial direction orthogonal to the axial direction, the clutch motor being coupled to a tub of a washing machine;
- a drawer coupled to the clutch motor and configured to move in the radial direction by the clutch motor;
- a lifter comprising an arm portion in contact with a back side end of the clutch, the lifter being configured to move in the axial direction based on movement of the drawer; and
- a return spring disposed between the clutch and the gear housing, the return spring being configured to apply pressure to the clutch toward the back side in the axial direction.

13. The washing machine driving system of claim 12, wherein the clutch driving portion further comprises a holder that supports the drawer and the lifter.

14. The washing machine driving system of claim 12, wherein the drawer and the lifter each comprise an inclined portion configured to move the lifter in the axial direction based on movement of the drawer.

15. The washing machine driving system of claim 12, wherein the lifter further comprises a guide, and
- wherein the motor further comprises a stator, the stator defining a guide insert portion configured to receive the guide.

16. The washing machine driving system of claim 15, wherein the stator or the lifter comprises a moment preventing portion configured to block rotational force from being applied to the guide based on the lifter moving in the axial direction.

17. The washing machine driving system of claim 16, wherein the moment preventing portion comprises a protrusion that protrudes from the stator in the radial direction.

18. The washing machine driving system of claim 12, wherein the sun gear, the ring gear, and the plurality of pinion gears each comprise one or more helical gears.

19. The washing machine driving system of claim 13, wherein the holder is disposed forward relative to the drawer and disposed between the clutch motor and the drawer in the radial direction.

20. A washing machine comprising the washing machine driving system of claim 1.

* * * * *